(12) United States Patent
Yamamoto

(10) Patent No.: US 7,687,974 B2
(45) Date of Patent: Mar. 30, 2010

(54) VIBRATION TYPE DRIVING APPARATUS

(75) Inventor: Shinji Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 11/969,717

(22) Filed: Jan. 4, 2008

(65) Prior Publication Data

US 2008/0169727 A1 Jul. 17, 2008

(30) Foreign Application Priority Data

Jan. 11, 2007 (JP) .............................. 2007-003682

(51) Int. Cl.
H02N 2/00 (2006.01)
(52) U.S. Cl. .................................. 310/323.16
(58) Field of Classification Search .................. 310/12, 310/323.01, 323.04, 323.05, 323.09, 323.13, 310/323.16, 323.17
See application file for complete search history.

(56) References Cited

U.S. PATENT DOCUMENTS

| | | | | |
|---|---|---|---|---|
| 3,246,608 A | * | 4/1966 | Cooper .................. | 104/134 |
| 4,672,256 A | * | 6/1987 | Okuno et al. ........... | 310/323.07 |
| 4,857,793 A | * | 8/1989 | Okuno .................. | 310/323.02 |
| 5,039,899 A | * | 8/1991 | Yamaguchi ............ | 310/323.16 |
| 5,101,132 A | * | 3/1992 | Yamaguchi ............ | 310/323.16 |
| 5,237,238 A | * | 8/1993 | Berghaus ............... | 310/328 |
| 5,416,375 A | * | 5/1995 | Funakubo et al. ...... | 310/323.16 |
| 5,783,899 A | * | 7/1998 | Okazaki ................ | 310/317 |
| 6,448,697 B1 | * | 9/2002 | Vaughn ................. | 310/348 |
| 7,109,639 B2 | * | 9/2006 | Yamamoto et al. ..... | 310/323.16 |
| 2004/0189150 A1 | * | 9/2004 | Yamamoto et al. ..... | 310/323.02 |
| 2007/0069609 A1 | * | 3/2007 | Kojima et al. .......... | 310/323.01 |

FOREIGN PATENT DOCUMENTS

| | | |
|---|---|---|
| JP | 06-311765 | 11/1994 |
| JP | 2004-304887 | 10/2004 |
| JP | 2005-354787 | * 12/2005 |

* cited by examiner

Primary Examiner—Thomas M Dougherty
(74) Attorney, Agent, or Firm—Canon USA Inc IP Div

(57) ABSTRACT

A vibration type driving apparatus includes a vibrating member configured to simultaneously generate a plurality of standing wave vibrations to cause an elliptic motion on surfaces located at nodes of the standing wave vibration, a driving unit formed on the surface located at the node to perform the elliptic motion, and a moving member configured to contact the driving unit and to be driven by the elliptic motion. The driving unit protrudes from a surface of the vibrating member, and includes a first driving unit and a second driving unit that are formed to sandwich the moving member in a perpendicular direction to the surface. The first driving unit and the second driving unit are located at the nodes that are separated by odd-number times a half-wave length of the standing wave vibration, and located where the directions of the elliptic motions are opposite to each other.

7 Claims, 9 Drawing Sheets

MODE A

MODE B

MODE A

MODE B

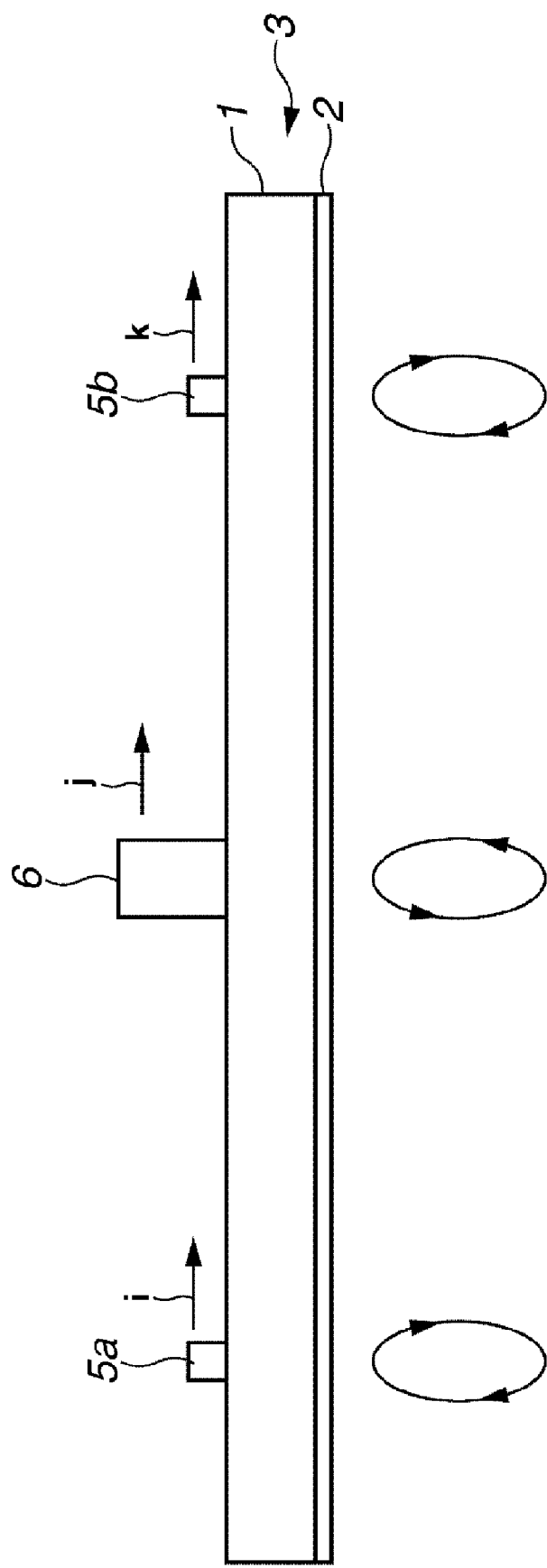

VIBRATION TYPE DRIVING APPARATUS

BACKGROUND OF THE INVENTION

1. Field of the Invention

The present invention relates to a vibration type driving apparatus.

2. Description of the Related Art

Conventionally, there are ultrasonic motors of a vibration type driving apparatus that linearly drive a driven member. For example, Japanese Patent Application Laid-Open No. 06-311765 discusses an ultrasonic motor that excites a plate-like vibrating member with a standing wave having two bending modes to generate elliptic vibration at a predetermined portion of the vibrating member. The ultrasonic motor drives a moving member by bringing the moving member in contact with the predetermined portion.

Moreover, Japanese Patent Application Laid-Open No. 2004-304887 discusses an ultrasonic motor that generates a standing wave having two bending modes that are at right angles to each other to excite a vibrating member having a projection with a raised portion. In such a configuration, an elliptic motion that is generated by the combination of the two bending modes drives a moving member.

In the above-described vibration type driving apparatuses, vibration generated by a vibrating member is realized only in a bending mode. Therefore, the vibrating member can be thinned.

However, there are the following problems in the above-described conventional vibration type driving apparatuses. As described above, the vibration generated by a vibrating member is realized only in the bending mode, so that the vibrating member can be thinned. On the other hand, a pressurization unit that presses the moving member onto the vibrating member or a guide mechanism for regulating the moving direction of the moving member is required. As a result, it is difficult to reduce the size of a vibration type driving apparatus (or an ultrasonic actuator).

Furthermore, to reduce the size of the pressurization unit, a moving member can be formed by a magnet, and the moving member can be pressed onto the vibrating member by magnetic force. However, a vibration type driving apparatus of such a configuration cannot take advantage of non-magnetism, which is one of the features of an ultrasonic actuator.

Additionally, Japanese Patent Application Laid-Open No. 06-311765 discusses a plurality of ultrasonic actuators that do not require a guide mechanism. However, the shape of the vibrating member or the moving member is complex, so that the size of such ultrasonic actuators cannot be sufficiently reduced. Furthermore, such ultrasonic actuators are not easy to manufacture.

Therefore, further improvements may be made by providing a vibration type driving apparatus that can press the moving member onto the vibrating member in a simple configuration, and that can enlarge thrust at the time of driving as well as holding force when power is not fed. Moreover, further improvements may be made by providing a vibration type driving apparatus that can regulate the moving direction of a moving member without providing a special guide mechanism, so that the size can be greatly reduced.

SUMMARY OF THE INVENTION

The present invention is directed to a vibration type driving apparatus. According to an aspect of the present invention, a vibration type driving apparatus includes a vibrating member configured to simultaneously generate a plurality of standing wave vibrations to cause an elliptic motion on surfaces located at a plurality of nodes of the standing wave vibration, a driving unit formed on the surface located at the node to perform the elliptic motion, and a moving member configured to be in contact with the driving unit and to be moved by the elliptic motion. The driving unit protrudes from a surface of the vibrating member, and includes a first driving unit and a second driving unit that are formed to sandwich the moving member in a perpendicular direction to the surface. The first driving unit and the second driving unit are formed at locations of the nodes that are separated by odd-number times a half-wave length of the standing wave vibration, and at locations where the directions of the elliptic motions are opposite to each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates elliptic motions caused in protruding members and a control member respectively as seen in a direction of an arrow G in FIG. 1.

DETAILED DESCRIPTION OF THE EMBODIMENTS

Various exemplary embodiments, features, and aspects of the invention will be described in detail below with reference to the drawings.

A vibration type driving apparatus according to an exemplary embodiment of the present invention is applied to an ultrasonic linear motor using vibration that is excited in a vibrating member to drive a moving member that is in contact with the vibrating member.

First Exemplary Embodiment

Figure 1:
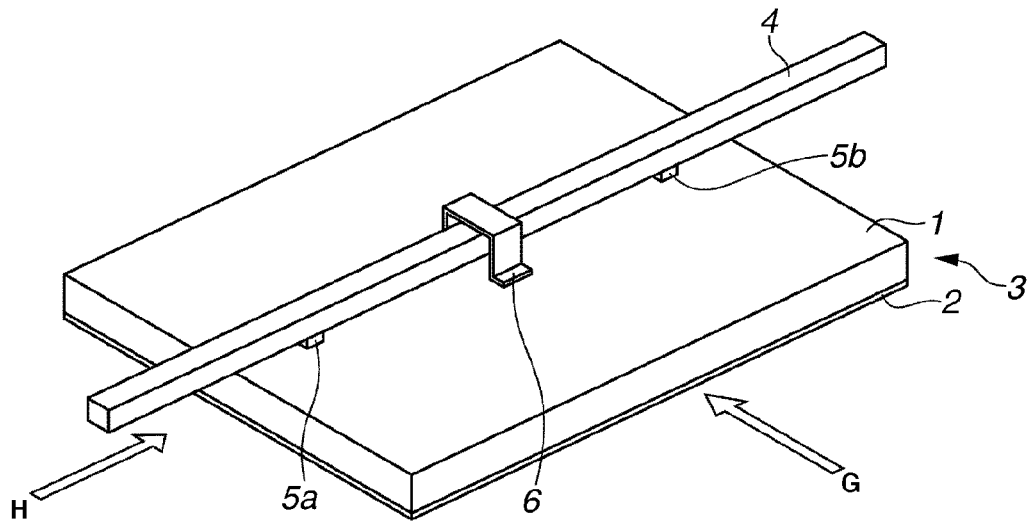
FIG. 1 illustrates a perspective view of a configuration of an ultrasonic linear motor according to a first exemplary embodiment of the present invention.
Figure 2:
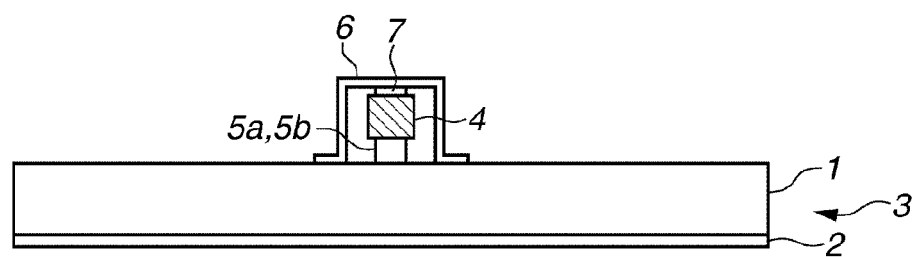
FIG. 2 illustrates a cross-sectional view of a configuration of the ultrasonic linear motor, as seen in a direction of an arrow H in FIG. 1.

FIG. 1 illustrates a perspective view of a configuration of an ultrasonic linear motor according to a first exemplary embodiment of the present invention. FIG. 2 illustrates a cross-sectional view of the ultrasonic linear motor as seen in a direction of an arrow H in FIG. 1. The ultrasonic linear motor includes a vibrating member 3 formed by a rectangular flat-plate material, and a slider 4 (i.e., a sliding member) that moves relative to the vibrating member 3. The ultrasonic linear motor also includes a plurality of driving units between which the sliding member 4 is disposed, and that controls a moving direction of the slider 4. The plurality of driving units includes a control member 6 and projecting members 5a, 5b.

The vibrating member 3 has a structure in which an elastic member 1 is formed from a metal plate, and a piezoelectric element 2 (i.e., an electromechanical energy conversion element) is fixed to the elastic member 1 by bonding. In FIG. 2, a shaded portion indicates a cross-section of the slider 4. The protruding members 5a, 5b can be fixed onto the upper surface of the elastic member 1 by welding or bonding, and the slider 4 is placed on top of the protruding members 5a, 5b. The protruding members 5a, 5b transmit a force that is generated in the vibrating member 3 to the slider 4.

Figure 3:
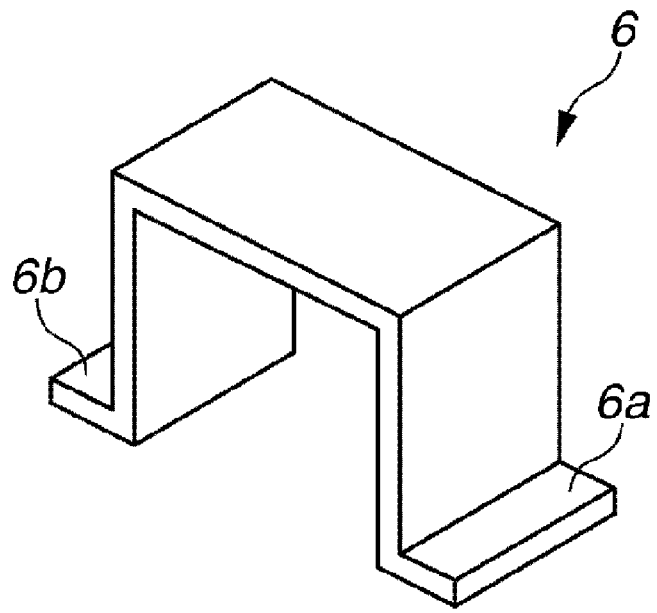
FIG. 3 illustrates a perspective view of a control member.

FIG. 3 illustrates a perspective view of the control member 6. The control member 6 is a crank-shaped plate material (or a vertical member). Joints 6a, 6b formed on the control member 6 can be fixed onto the elastic member 1 by welding or bonding. Moreover, a protruding member 7 is fixed on the inner side of the control member 6 by welding or bonding.

The slider 4 is inserted into a space between the inner side of the control member 6 and the elastic member 1, so as to contact the protruding members 5a, 5b and the protruding member 7 fixed on the inner side of the control member 6. Different sides of the slider 4 are respectively in contact with the protruding members 5a, 5b and with the protruding member 7. That is, the protruding members 5a, 5b and the protruding member 7 contact the slider 4 from opposite sides, and function as a driving unit. Moreover, since the slider 4 is inserted into the space between the control member 6 and the elastic member 1, the slider 4 is pressed in a direction that is perpendicular to the moving direction (i.e., perpendicular to the surface of the vibrating member 3). The motion of the slider 4 is thus controlled.

Figure 4:
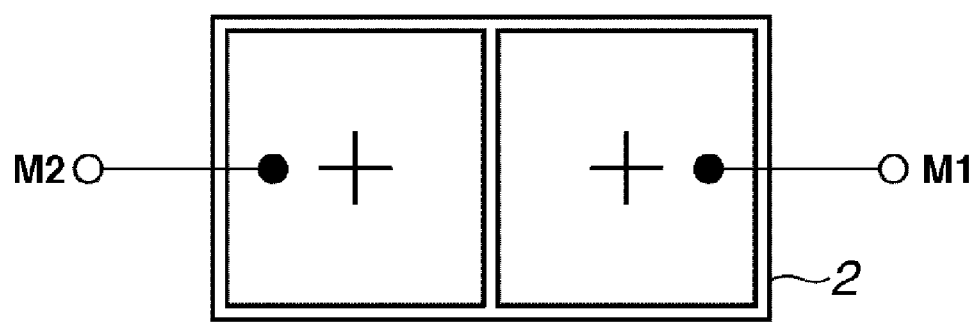
FIG. 4 illustrates a side of a piezoelectric element, as seen from a side opposite to an elastic member.

The drive principle of the ultrasonic linear motor is described below. FIG. 4 illustrates a side of the piezoelectric element 2 as seen from a side opposite to the elastic member 1. Two electrodes M1, M2 are disposed on a side opposite to the side of the piezoelectric element 2 that is bonded to the elastic member 1. In FIG. 4, "+" denotes the direction of polarization, and the direction of polarization of the two electrodes are the same.

Figure 5A:
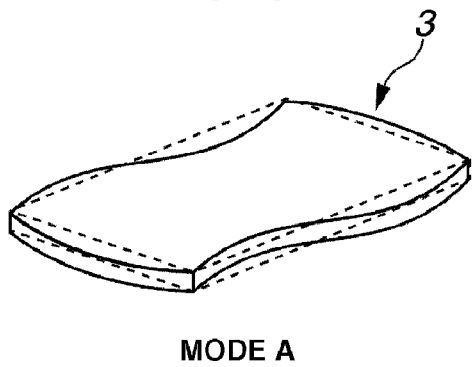
FIGS. 5A and 5B illustrate two vibration modes used in driving an ultrasonic linear motor.
Figure 5B:
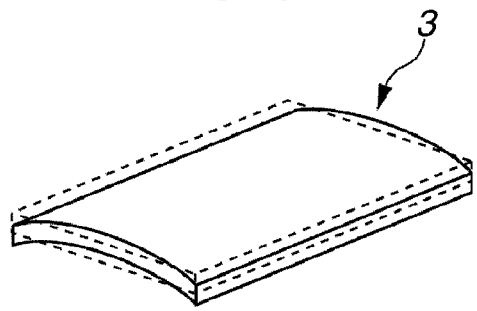

FIGS. 5A and 5B illustrate two vibrating modes used in driving an ultrasonic linear motor. The present embodiment uses a two-dimensional bending vibration mode in a direction of the long side of the rectangular vibrating member 3, that will be referred to as mode A. Additionally, the present embodiment uses a first-order bending vibration mode in a direction of the short side of the rectangular vibrating member 3, that will be referred to as mode B. The protruding members 5a, 5b and the control member 6 described above are omitted in FIGS. 5A and 5B.

The shape of the vibrating member 3 is determined so that the resonant frequencies of mode A and mode B are nearly the same. A standing wave vibration of mode B is generated when alternating voltages of the same phases are applied to the electrodes M1 and M2 of the piezoelectric element 2 at the same frequencies near the resonant frequency. Moreover, a standing wave vibration of mode A is generated when alternating voltages of reverse phases are applied to the electrodes M1 and M2 of the piezoelectric element 2 at the same frequencies near the resonant frequency. In both cases, the side of the piezoelectric element 2 that is bonded to the elastic member 1 acts as a ground electrode.

Figure 6A:
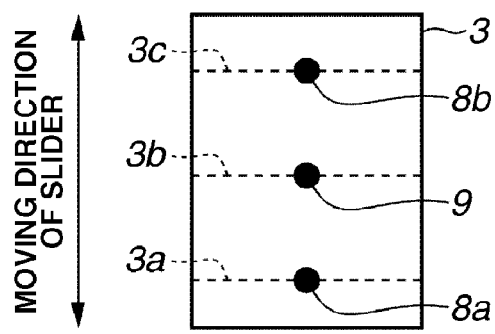
FIGS. 6A and 6B illustrate nodes of vibrations of mode A and mode B.
Figure 6B:
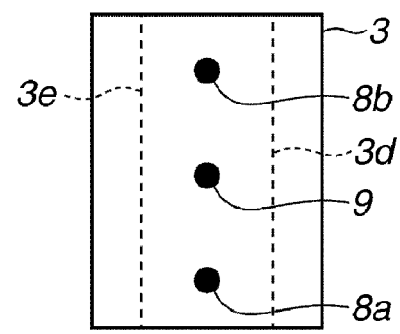

FIGS. 6A and 6B illustrate nodes of the vibration mode A and the vibration mode B. Dotted lines in FIGS. 6A and 6B represent nodes 3a, 3b, and 3c in the vibration mode A and nodes 3d and 3e in the vibration mode B respectively. The nodes 3a, 3b, and 3c in the vibration mode A are linear and perpendicular to the moving direction of the slider 4. That is, a plurality of nodes is aligned in the moving direction of the slider 4. On the contrary, the nodes 3d and 3e in the vibration of mode B are linear and parallel to the moving direction of the slider 4.

Positions 8a, 8b, and 9 are each located on the nodes 3a, 3b, and 3c of mode A, and also correspond to the anti-node portions of mode B. The protruding members 5a, 5b described above are each fixed on positions 8a and 8b of the vibrating member 3. Furthermore, the control member 6 is fixed on a position 9 of the vibrating member 3.

The protruding members 5a, 5b and the control member 6 are each located on a different node of the standing wave vibration of mode A. Moreover, the protruding members 5a, 5b and the control member 6 are disposed at a distance of odd-number times a half-wave length of the standing wave vibration of mode A. Furthermore, when a plurality of protruding members (in this case, two protruding members 5a, 5b) is aligned in the moving direction of the slider 4, the plurality of protruding members are disposed at a distance of even-number times a half-wave length of the standing wave vibration of mode A. Furthermore, when a plurality of control members (such as two control members 15a, 15b in a second exemplary embodiment that will be described later) is aligned in the moving direction of the slider 4, the plurality of control members is disposed at a distance of even-number times a half-wave length of the standing wave vibration of mode A.

When alternating voltages of a phase difference that is neither a same phase nor a reverse phase to the electrodes M1 and M2 are applied, vibrations of mode A and mode B are simultaneously generated in the vibrating member 3. Further, when the amplitudes of the voltages applied to the electrodes M1 and M2 are the same, there is a 90° phase lead or a 90° phase lag in the vibration of mode A against the vibration of mode B which will be described below.

An alternate voltage $A\sin(\omega t)$ is applied to the electrode M1, and an alternate voltage $A\sin(\omega-\theta)$ is applied to the electrode M2. Consequently, the difference between the alternate voltages applied to the electrodes M1 and M2 excites a vibration of mode A, as described by the following equation (1):

$$A\sin(\omega t) - A\sin(\omega t-\theta) = 2A\sin(\theta/2)\cos(\omega t-\theta/2) \quad (1)$$

Further, the sum of the alternate voltages applied to the electrodes M1 and M2 excites a vibration of mode B, as described by the following equation (2);

$$A\sin(\omega t)+A\sin(\omega t-\theta)=2A\cos(\theta/2)\sin(\omega t-\theta/2) \quad (2)$$

When the above-described equations (1) and (2) are compared, the portions that are dependent on time t is the cosine function in mode A and the sine function in mode B. Since the angle of the deviation θ/2 is the same, the phase difference is either 90° or −90°. Therefore, whether a vibration of mode B leads or delays from the vibration of mode A depends on the phase difference θ.

Moreover, according to the equations (1) and (2), if the alternating voltages applied to electrodes M1, M2 are of the same phases, or the phase difference θ is 0°, only mode B is excited. On the contrary, if the alternating voltages are of reverse phases, or the phase difference θ is 180°, only mode A is excited.

A case where the phase difference θ is 0<θ<180° will be described below. In such a case, both portions in equations (1) and (2) that do not depend on time t are of a positive polarity. Therefore, there is a phase lead of 90° in the vibration of mode A as against the vibration of mode B.

FIGS. 7A, 7B, 7C, 7D illustrate a deformity of the central portion of the vibrating member 3 as seen from a direction G and from a direction H described in FIG. 1, in an exaggerated form. The vibration of mode A is observed as a bending deformity as seen from the direction G. The vibration of mode B is observed as a bending deformity as seen from the direction H.

Figure 7A:
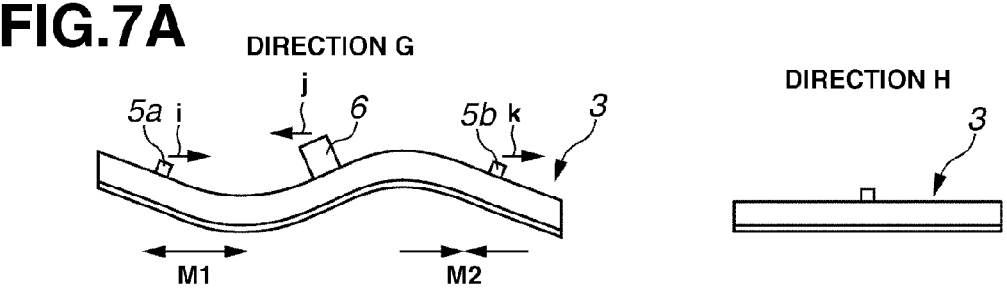
FIGS. 7A, 7B, 7C, and 7D illustrates a deformity at the center of the vibrating member in an exaggerated form.

The deformity of the vibrating member 3 shifts in order from FIGS. 7A, 7B, 7C, 7D, and back to 7A. FIG. 7A illustrates a state where voltages of the same amplitude are applied to the electrodes M1 and M2. In addition, FIG. 7A illustrates an instant when the electrode M1 is of a positive (+) polarity and the electrode M2 is of a negative (−) polarity. Under such condition, the piezoelectric element 2 on the side of the electrode M1 expands and the piezoelectric element 2 on the side of the electrode M2 contracts. A bending deformity is thus generated by a bimorph effect. Moreover, since the sum of the voltages applied to the electrodes M1 and M2 is 0, the bending deformity as seen from the direction H cancels each other.

Figure 7B:
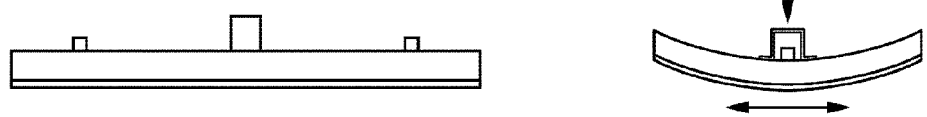

FIG. 7B illustrates a state where voltages of the same amplitude are applied to the electrodes M1 and M2 and an instant when both the electrodes M1 and M2 are of a positive (+) polarity. In such a case, a bending deformity is not generated when viewed from the direction G. However, since the piezoelectric element 2 expands when viewed from the direction H, a deformity of a downward protrusion occurs in the vibrating member 3.

Figure 7C:
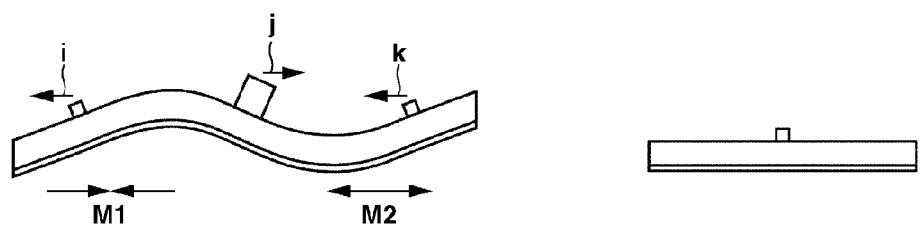
Figure 7D:
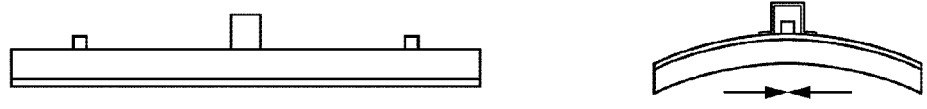

Similarly, FIG. 7C illustrates a state where the same voltages of the same amplitude are applied to the electrodes M1 and M2 and an instant when the electrode M1 is of a negative (−) polarity and the electrode M2 is of a positive (+) polarity. FIG. 7D illustrates a state where voltages of the same amplitude are applied to the electrodes M1 and M2 and an instant when the electrodes M1 and M2 are both of a negative polarity (−).

As the deformity of the vibrating member 3 shifts in order from FIGS. 7A, 7B, 7C, to 7D, the protruding members 5a, 5b and the control member 6 provided on the vibrating member 3 are each deformed in directions of arrows 1, j, and k in FIGS. 7A and 7C. As a result, the protruding members 5a, 5b and the control member 6 move elliptically when viewed from the direction G, and move up and down when viewed from the direction H.

FIG. 8 illustrates the elliptic motion that is generated in each of the protruding members 5a, 5b and the control member 6 as seen from the direction G. The rotational direction of the elliptic motion in the protruding members 5a, 5b is opposite to the rotational direction of the elliptic motion in the control member 6. That is, the protruding members 5a, 5b and the control member 6 that are disposed on opposite sides of the slider 4 simultaneously excite elliptic motions that rotate in directions reverse to each other.

As illustrated in FIG. 2, the slider 4 is in contact with the tips of the protruding members 5a, 5b. Since the slider 4 is subject to maximum forces when the protruding members 5a, 5b are displaced to the highest point in FIG. 8, the slider 4 is subject to force in the right direction. On the other hand, the slider 4 is in contact with the protruding member 7, which is fixed on the inner side of the control member 6. Since the slider 4 is subject to maximum forces when the control member 6 is displaced to the lowest point in FIG. 8, the slider 4 is subject to forces in the right direction.

Therefore, the rotational directions of the elliptic motions at each contact point between the slider 4 and the vibrating member 3 are different. However, the slider 4 is subject to forces in the same direction at each contact point.

In the equations (1) and (2), if the phase difference θ is 180°<θ<360° and alternate voltages are applied to the electrodes M1 and M2, the rotational directions of the elliptic motions at each contact point are reversed. Therefore, the slider 4 is subject to forces in the left direction of FIG. 8 at all contact points.

As described above, in an ultrasonic linear motor according to the first exemplary embodiment, the protruding members 5a, 5b and the control member 6 are simply structured to sandwich the slider 4, so that the slider 4 can be pressed against the vibrating member 3. As a result, thrust generated when the ultrasonic linear motor is driven, and holding forces when power is not fed into the ultrasonic linear motor can be increased. Moreover, since a special guide mechanism for regulating the moving direction of a slider is not required, a compact linear drive unit can be realized.

Figure 9:
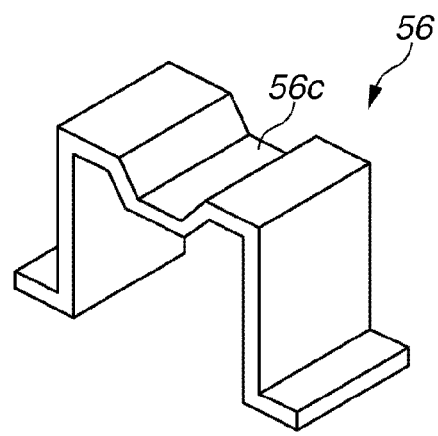
FIG. 9 is a perspective view of other control members.

Furthermore, by optimizing the stiffness of the control member 6 to be appropriately elastic, the control member 6 can also act as a pressurizing mechanism that is required in an ultrasonic linear motor. FIG. 9 is a perspective view of a control member 56 that is different from the control member 6. A recessed portion 56c is formed on the upper surface of the control member 56, so that the control member 56 protrudes inwards. The stiffness of the control member 56 can be optimized by adjusting the shape of the recessed portion 56c. As a result, the pressurizing mechanism can be simplified, and the size of the ultrasonic linear motor can be reduced further.

Moreover, the protruding members 5a, 5b can be formed by an elastic material so that the protruding members 5a, 5b can be elasticized instead of elasticizing the control member 6.

Second Exemplary Embodiment

Figure 10:
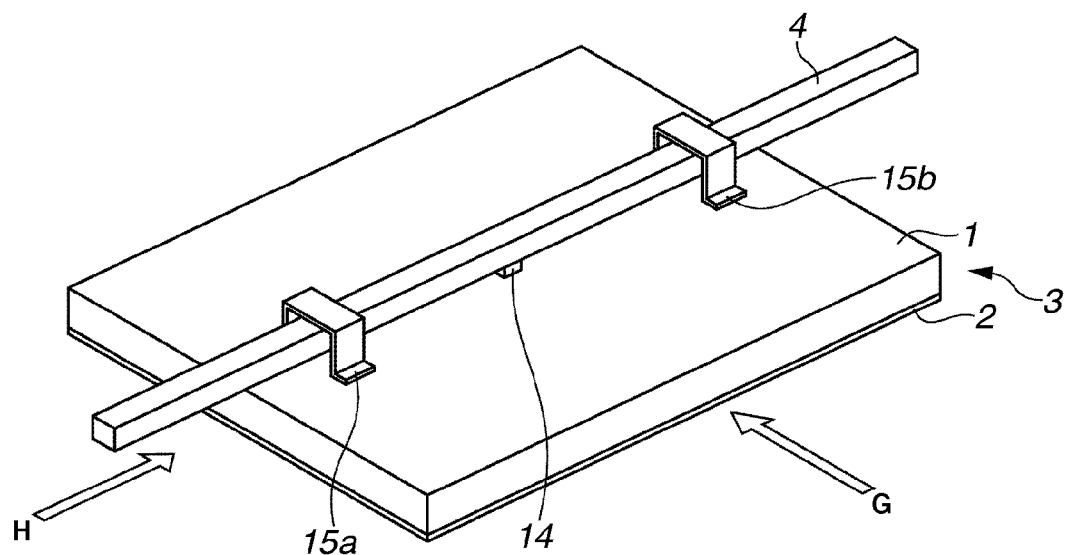
FIG. 10 illustrates a perspective view of a configuration of an ultrasonic linear motor according to a second exemplary embodiment of the present invention.

FIG. 10 illustrates a perspective view of an ultrasonic linear motor according to a second exemplary embodiment of the present invention. Components that are the same as those in the first exemplary embodiment are assigned the same reference numerals, and description of such components is omitted.

In the first exemplary embodiment, the protruding members 5a, 5b are disposed on the nodes 3a and 3c at both sides among the three nodes 3a, 3b, and 3c that are generated in the vibrating member 3. In the second exemplary embodiment, control members 15a, 15b are disposed on nodes 3a and 3c at both sides. A control member 14 is disposed on the middle node 3b. Furthermore, a protruding member (not shown) is fixed on the inner sides of the control members 15a, 15b, similar to the control member 6 in the first exemplary embodiment.

In the ultrasonic linear motor according to the second exemplary embodiment, the control members 15a, 15b and the protruding member 14 perform elliptic motion as in the first exemplary embodiment. The directions of the elliptic motions of the control members 15a, 15b and of the protruding member 14 are different. The protruding members (not shown) fixed on the inner sides of the control members 15a, 15b are in contact with the slider 4. Consequently, the slider 4 is subject to maximum forces when displacement of the control members 15a, 15b towards the piezoelectric element 2 is the largest. On the other hand, since the tip of the protruding member 14 is in contact with the slider 4, the slider 4 is subject to maximum forces when displacement of the protruding member 14 towards the opposite side of the piezoelectric element 2 is the largest. Therefore, the slider 4 is subject to forces in the same direction at the three contact points.

Moreover, the moving direction of the slider 4 is controlled by the control members 15a, 15b that are disposed on both sides of the vibrating member 3. In particular, the control members 15a, 15b control the movement of the slider 4 in the direction of the arrow G in FIG. 10.

As described above, the ultrasonic linear motor according to the second exemplary embodiment can more reliably control the moving direction of the slider 4, in addition to obtaining the results achieved in the first exemplary embodiment.

Third Exemplary Embodiment

Figure 11:
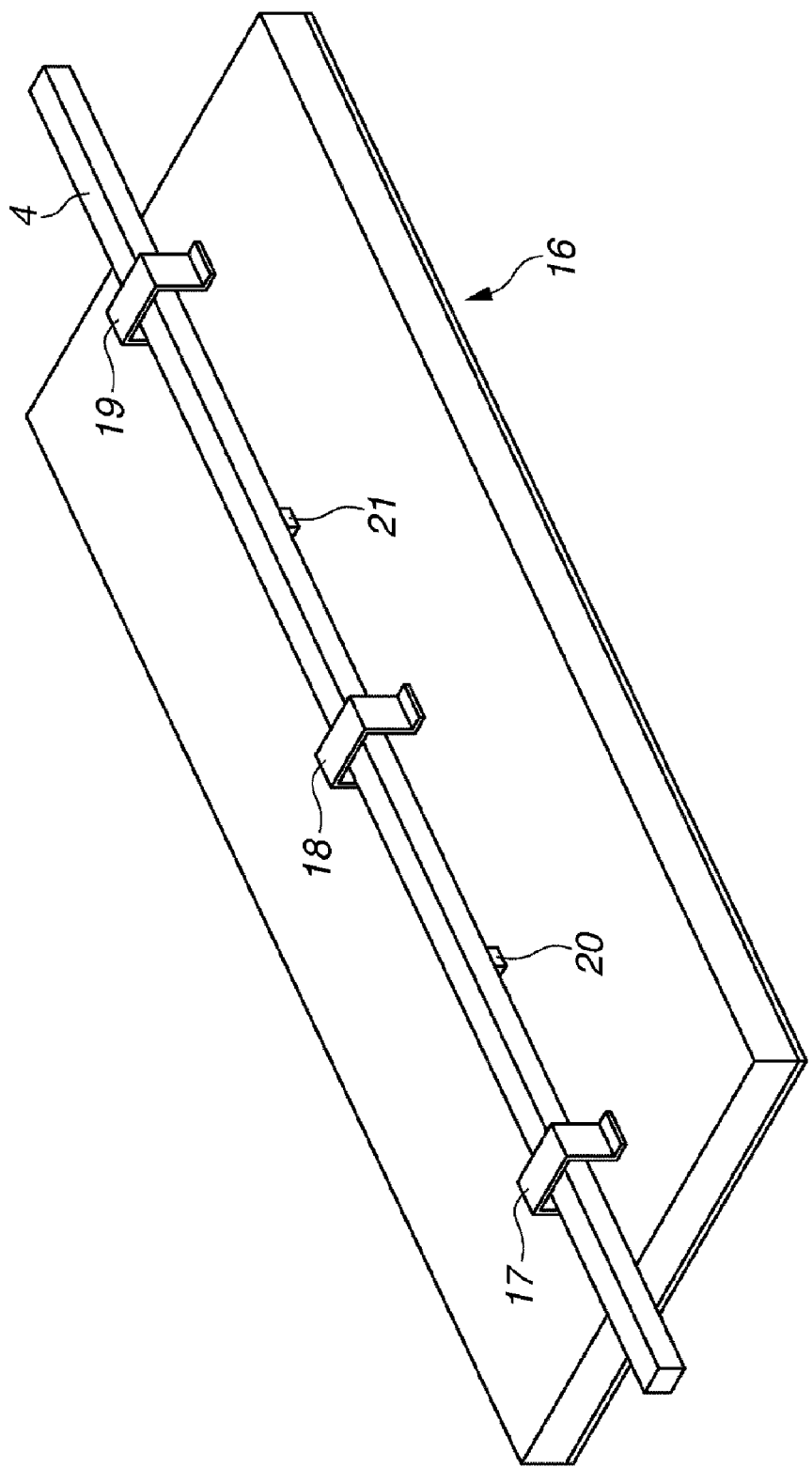
FIG. 11 illustrates a perspective view of a configuration of an ultrasonic linear motor according to a third exemplary embodiment of the present invention.

FIG. 11 is a perspective view of an ultrasonic linear motor according to a third exemplary embodiment. Components that are the same as those in the first exemplary embodiment are assigned the same reference numerals, and description of such components is omitted.

Figure 12:
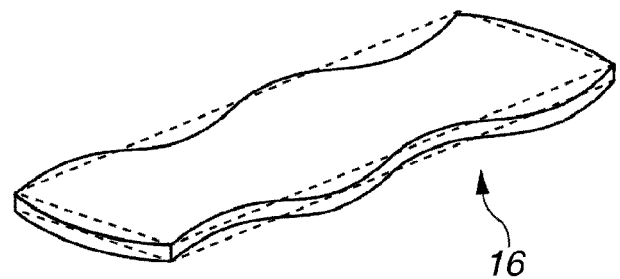
FIG. 12 illustrates a four-dimensional bending mode in a vibrating member.

In the first and second exemplary embodiments, the vibration mode in the direction of the longer side of the vibrating member is a two-dimensional bending vibration mode. The third exemplary embodiment uses a four-dimensional bending mode in a vibrating member 16, so that there are five nodes in the bending mode (mode A) in the direction of the longer side. FIG. 12 illustrates the four-dimensional bending mode in the vibrating member 16.

The length of the longer side of the vibrating member 16 is longer than that in the first and second exemplary embodiments. Moreover, control members 17, 18, 19 and protruding members 20, 21 are disposed in accordance with the rule described in the first exemplary embodiment, i.e., at the five nodes that appear in the vibrating member 16. Therefore, the slider 4 of the ultrasonic linear motor in the third exemplary embodiment is also subjected to forces in the same direction at each node.

As described above, in addition to the results obtained in the first and second exemplary embodiments, the ultrasonic linear motor according to the third exemplary embodiment can increase the number of contact points of the slider 4. Therefore, the ultrasonic linear motor can increase force (thrust) to be generated in the slider 4.

Fourth Exemplary Embodiment

Figure 13:
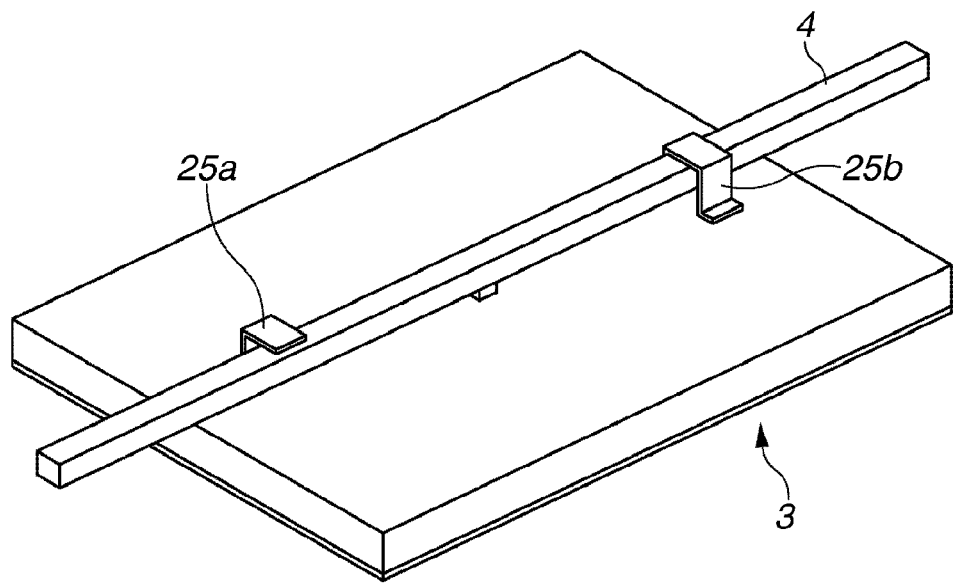
FIG. 13 illustrates a perspective view of a configuration of an ultrasonic linear motor according to a fourth exemplary embodiment of the present invention.

FIG. 13 is a perspective view of an ultrasonic linear motor according to a fourth exemplary embodiment. Components that are the same as those in the first exemplary embodiment are assigned the same reference numerals, and description of such components is omitted.

The shape of a control member in the fourth exemplary embodiment is different from the second exemplary embodiment. In the second exemplary embodiment, the control member is a crank-shaped plate member (vertical member) that is joined to the vibrating member at two points on both sides. On the contrary, in the fourth exemplary embodiment, control members 25a, 25b are inverted L-shaped plates that are joined to the vibrating member 3 at only one side.

In the ultrasonic linear motor according to the fourth exemplary embodiment, the amount of bending of the control members 25a, 25b can be readily changed. Consequently, the pressing force in pressing the slider 4 onto the vibrating member 3 can be easily adjusted. Moreover, in assembling the ultrasonic linear motor, it is not necessary to insert the slider 4 from the front openings of the control members 25a, 25b. Instead, the slider 4 can be inserted from the open (unfixed) side of the control members 25a, 25b, so that assembling is simplified.

Fifth Exemplary Embodiment

Figure 14:
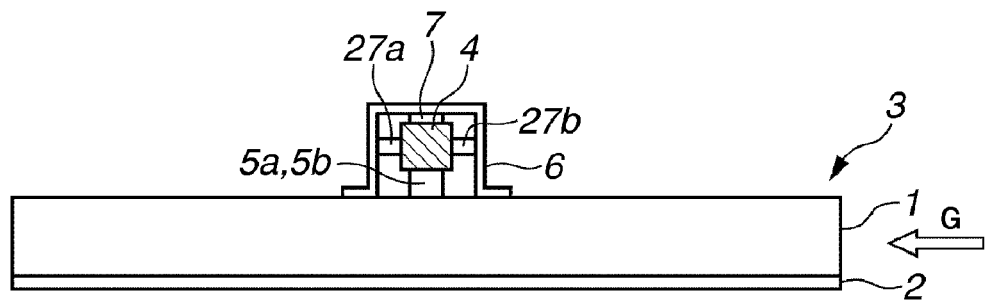
FIG. 14 illustrates a front view of an ultrasonic linear motor according to the fifth exemplary embodiment of the present invention as seen from a moving direction of a slider.

FIG. 14 is a front view of an ultrasonic linear motor according to a fifth exemplary embodiment as seen from a moving direction of a slider. Components that are the same as those in the first exemplary embodiment are assigned the same reference numerals, and description of such components is omitted.

Unlike the first exemplary embodiment, slide members 27a, 27b are fixed on the inner side of the control member 6 in the fifth exemplary embodiment, to control the movement of the slider 4 in the transverse direction (or horizontal direction in FIG. 14).

As a result, the moving direction of the slider 4 can be more reliably controlled in the fifth exemplary embodiment. In particular, the movement of the slider 4 in a direction of an arrow G in FIG. 14 can be controlled. Rollers that reduce friction by rolling can be disposed instead of slide members 27a, 27b.

Sixth Exemplary Embodiment

Figure 15:
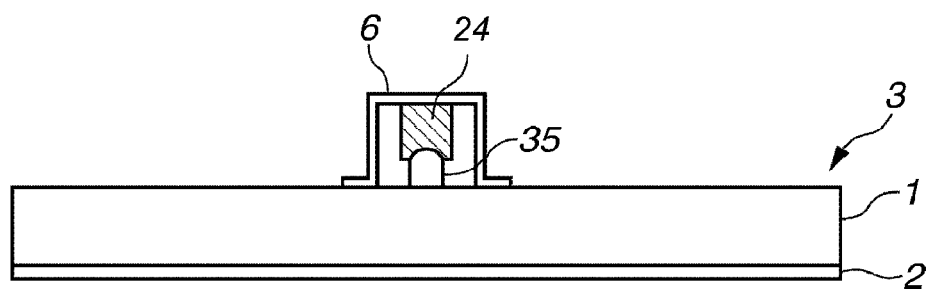
FIG. 15 illustrates a front view of an ultrasonic linear motor according to the sixth exemplary embodiment of the present invention as seen from a moving direction of a slider.

FIG. 15 is a front view of an ultrasonic linear motor according to a sixth exemplary embodiment as seen from a moving direction of a slider. Components that are the same as those in the first exemplary embodiment are assigned the same reference numerals, and description of such components is omitted.

Unlike the first exemplary embodiment, a recessed portion is formed along the moving direction on the bottom surface of a slider 24 in the sixth exemplary embodiment. Moreover, a raised portion is formed on the top surface of a protruding member 35. The moving direction of the slider 24 is reliably controlled by the slider 24 moving relative to the protruding member 35 with the raised portion and the recessed portion matching each other.

Seventh Exemplary Embodiment

Figure 16:
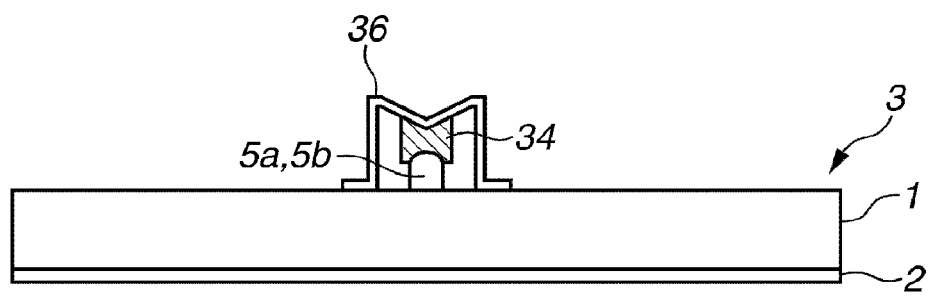
FIG. 16 illustrates a front view of an ultrasonic linear motor according to the seventh exemplary embodiment of the present invention as seen from a moving direction of a slider.

FIG. 16 is a front view of an ultrasonic linear motor according to a seventh exemplary embodiment as seen from a moving direction of a slider. Components that are the same as those in the first exemplary embodiment are assigned the same reference numerals, and description of such components is omitted.

Unlike the first exemplary embodiment, a recessed portion is formed along the moving direction on the top surface of a slider 34 in the seventh exemplary embodiment. Moreover, a control member 36 is an M-shaped plate material (vertical member), and the top surface of the inner side of the control member 36 is formed as a raised portion so as to match the recessed portion of the slider 34.

Consequently, the moving direction of the slider 34 is reliably controlled by the slider 34 moving relative to the control member 36 with the raised portion and the recessed portion matching each other.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-003682 filed Jan. 11, 2007, which is hereby incorporated by reference herein in its entirety.

What is claimed is:

1. A vibration type driving apparatus comprising:

a vibrating member configured to simultaneously generate a plurality of standing wave vibrations to cause an elliptic motion at locations on a surface of the vibrating member corresponding to a plurality of nodes of the standing wave vibrations;

a plurality of driving units formed on the surface and located at the plurality of nodes to perform the elliptic motion; and a moving member configured to contact the plurality of driving units and to be moved by the elliptic motion, wherein the plurality of driving units protrudes from the surface of the vibrating member, and includes a first driving unit and a second driving unit that are formed to sandwich the moving member in a perpendicular direction to the surface, wherein the first driving unit and the second driving unit are formed at locations of the nodes that are separated by odd-number times a half-wave length of one standing wave vibration among the plurality of standing wave vibrations, and at locations where the directions of the elliptic motions are opposite to each other, wherein the first driving unit includes a protruding member that protrudes from the surface of the vibrating member, and is formed to contact the moving member at a surface side thereof, and wherein the second driving unit protrudes from the surface of the vibrating member, and is formed to contact the moving member at a side opposite that contacted by the protruding member.

2. The vibration type driving apparatus according to claim 1, wherein a plurality of the first driving units is disposed at the nodes that are separated by even-number times a half-wave length of the standing wave vibration.

3. The vibration type driving apparatus according to claim 1, wherein the second driving unit includes a vertical member that protrudes from the surface of the vibrating member.

4. The vibration type driving apparatus according to claim 3, wherein at least one of the protruding member and the vertical member is elastic, and the moving member is sandwiched between the protruding member and the vertical member and is pressed.

5. The vibration type driving apparatus according to claim 3, wherein the vertical member is formed on the surface of the vibrating member in an inverted L-shaped or a clank-shaped form, and the moving member is set inside the inverted L-shaped or the clank-shaped vertical member.

6. The vibration type driving apparatus according to claim 3, wherein slide members are set on the vertical member so as to sandwich the moving member in a direction parallel to the surface.

7. The vibration type driving apparatus according to claim 3, wherein at least one of the protruding member and the vertical member has a raised portion matching a recessed portion formed on the moving member.

* * * * *